United States Patent [19]

Roe

[11] 4,447,344

[45] May 8, 1984

[54] DEWATERING AIDS FOR COAL AND OTHER MINERAL PARTICULATES

[75] Inventor: William J. Roe, Aurora, Ill.

[73] Assignee: Nalco Chemical Company, Oak Brook, Ill.

[21] Appl. No.: 500,497

[22] Filed: Jun. 2, 1983

[51] Int. Cl.³ .................. C09K 3/18; B01D 43/00; F26B 1/00; F26B 5/08

[52] U.S. Cl. ........................... 252/60; 252/540; 210/727; 210/728; 210/729; 210/778

[58] Field of Search .............. 252/60, 540; 210/727, 210/728, 729, 778

[56] References Cited

U.S. PATENT DOCUMENTS

| | | | |
|---|---|---|---|
| 2,101,472 | 12/1937 | Kormann | 106/13 |
| 2,116,682 | 5/1938 | Kleinicke et al. | 44/6 |
| 2,222,370 | 11/1940 | Mori | 169/44 |
| 2,373,727 | 4/1945 | West et al. | 106/13 |
| 2,436,146 | 2/1948 | Kleinicke | 252/88 |
| 2,454,886 | 11/1948 | Shapiro | 428/350 |
| 2,716,068 | 8/1955 | Fain et al. | 106/13 |
| 3,298,804 | 1/1967 | Schoch | 44/6 |
| 3,350,314 | 10/1967 | Dawtrey et al. | 106/13 |
| 3,362,910 | 1/1968 | Ordelt | 252/75 |
| 3,624,243 | 11/1971 | Scott et al. | 106/13 |
| 3,630,913 | 12/1971 | Scott et al. | 106/13 |
| 3,794,472 | 2/1974 | Macaluso et al. | 44/6 |
| 4,039,466 | 8/1977 | Matsuda et al. | 210/729 |
| 4,117,214 | 9/1978 | Parks et al. | 252/70 |
| 4,123,395 | 10/1978 | Maguire, Jr. et al. | 252/540 |
| 4,206,063 | 6/1980 | Wang et al. | 252/60 |
| 4,207,186 | 6/1980 | Wang et al. | 252/60 |
| 4,225,317 | 9/1980 | Kugel | 44/6 |
| 4,285,841 | 8/1981 | Barrat et al. | 252/174.21 |
| 4,339,338 | 7/1982 | Blake et al. | 252/70 |

Primary Examiner—John E. Kittle
Assistant Examiner—Robert A. Wax
Attorney, Agent, or Firm—John G. Premo; Robert A. Miller; Donald G. Epple

[57] ABSTRACT

A composition for altering the water function characteristics of a wet, particulate mineral mass combines a surfactant material having an HLB number of from about 6.0 to about 12.0 with a surfactant adsorption inhibitory amount of a coupling agent or hydrotrope. Urea may be added to the composition for the prevention of freezing.

10 Claims, 5 Drawing Figures

DEWATERING AIDS FOR COAL AND OTHER MINERAL PARTICULATES

This application is related to Ser. No. 364,463 filed on Apr. 1, 1982, now U.S. Pat. No. 4,410,431.

INTRODUCTION

This invention relates generally to chemical processing aids for use in conjunction with mining operations, and relates more particularly to chemical compositions for altering the water function characteristics in various bulk mineral handling procedures. In one specific aspect, the present invention relates to chemical aids for dewatering of ores including coal, lead, copper and taconite ores, glass sands and the like.

BACKGROUND OF THE INVENTION

Water is commonly employed in coal crushing and washing operations as a vehicle and to collect and suppress fines. However, water is desirably removed from cleaned ores and coal prior to delivery of the product to a user for two important reasons. First, surface moisture much in excess of about five percent can result in serious freezing of ore in railroad cars when shipment is made in sub-freezing weather. Second, and more importantly, in the case of coal any included moisture acts as a B.T.U. thief, the fuel value of clean coal being an inverse function of its moisture content. Likewise in the further processing of ores, moisture must often be removed.

In the past, partial dewatering of ore slurries has been accomplished by such procedures as filtration and centrifugation, sometimes followed by thermal drying to a target moisture level. In addition, dewatering aids have been utilized heretofore in instances where the cost effectiveness of the chemical additives exceeded the incremental equipment charges and related energy costs. One commonly employed dewatering aid has been a surface active chemical species known generically as sodium dialkylsulfosuccinate (see for example U.S. Pat. No. 4,210,531); but this material is often prohibitively expensive in its application, usually exhibits a very significant foaming tendency, and therefore has limited utility.

My commonly assigned related application, Ser. No. 364,463 filed Apr. 1, 1982, now U.S. Pat. No. 4,410,431, hereinafter incorporated by reference, discloses and claims the use of certain non-ionic surfactants useful as de-watering aids which have been combined with Tall Oil Fatty Acids so as to solubilize higher concentrations of the non-ionic surfactant. It was discovered, quite surprisingly in that application, that the two ingredients act synergistically in the dewatering of mineral concentrates.

SUMMARY OF THE INVENTION

The present invention resides in a special composition of a surfactant material having an advantageous hydrophile-lipophile balance, in combination with a hydrotrope or coupling agent which serves as an adsorption inhibitor for the surfactant. This novel composition has been manifestly useful in reducing the moisture content of various mineral products, exhibits beneficial residual effects, and test results suggest the presence of synergism in the combination. In one specific aspect, the instant invention contemplates the blending of a hydrotrope or coupling agent, preferably sodium xylene sulfonate, with an ethylene oxide adduct of a primary aliphatic alcohol of moderate chain length, such as tridecyl alcohol. Aliquot proportions of the ingredients have proved useful, while blends incorporating as much as sixty-five percent hydrotrope have exhibited less than optimum activity.

An additional useful component for the composition of this invention is urea. While providing freeze protection to the composition, urea also appears to add to the activity of the composition when treating metallic ores, notably copper ores. It is speculated that the amide functionality serves as a blocking agent on the ore surface.

The compositions of the invention are effective at low dosage rates per unit reduction in moisture content of the selected mineral product and, if desired, can be applied neat in order to avoid the necessity of both a dilution step and the corresponding equipment. The instant compositions are also desirably non-foaming in a centrate and act advantageously to modify the freezing characteristics of ores that have been dewatered by their use.

It is therefore a general object of the present invention to provide a new and improved composition for altering the water function characteristics of mineral slurries.

Another broad object of the instant invention is to provide a new and improved drying aid for dewatering wet, particulate mineral masses.

Still another object of the invention is to provide a chemical agent that combines dewatering effectiveness with residual freeze protection for coal and other mineral slurries.

These and other objects and features of the invention will become more apparent from a consideration of the following descriptions.

BRIEF DESCRIPTION OF THE DRAWINGS

Data from the working examples to be described hereinafter are set forth in graphical form in the drawings wherein.

DETAILED DESCRIPTION OF THE INVENTION

Figure 1:
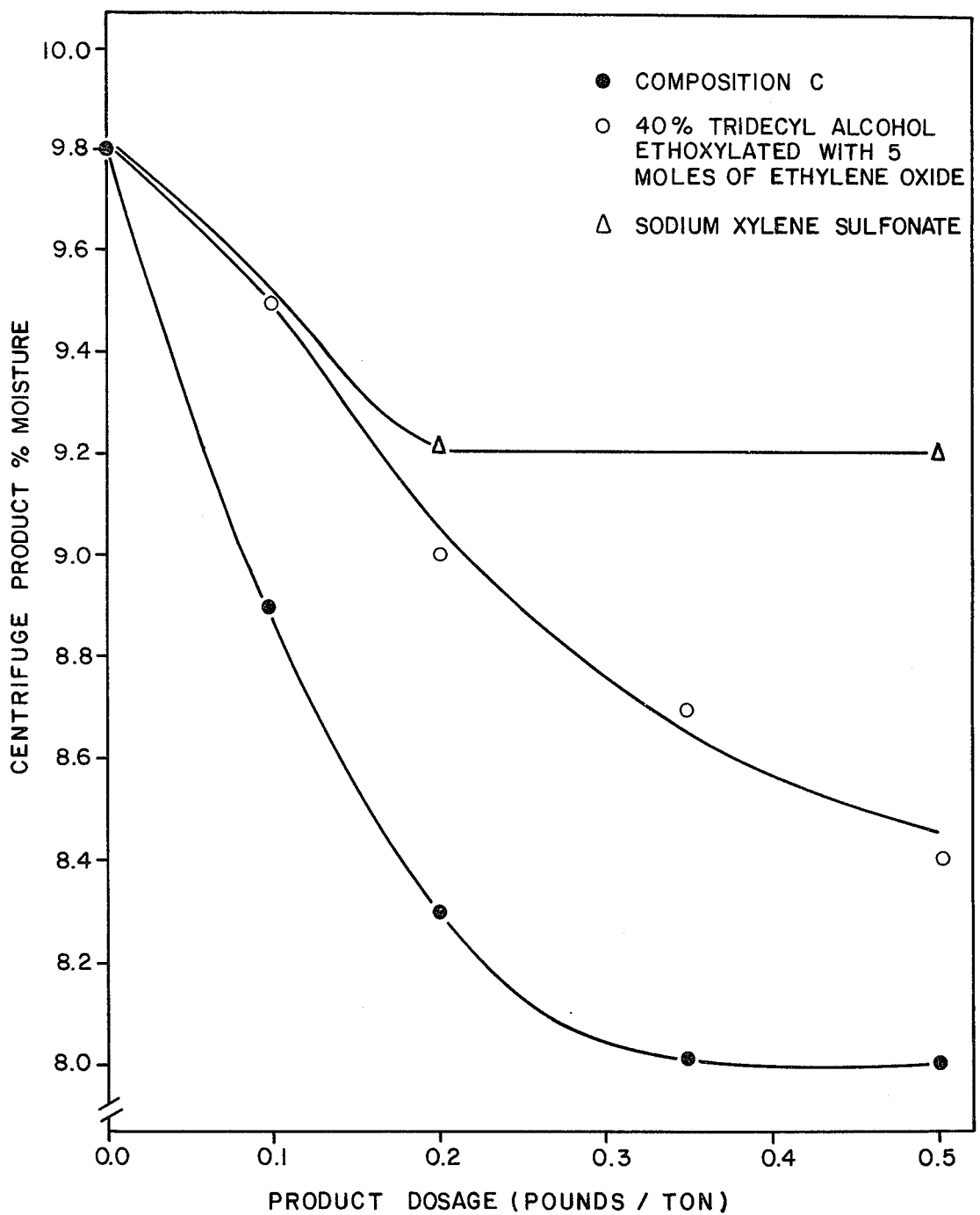
FIGS. 1-4 are plots of the moisture content of particulate coal products ($\frac{1}{4}''\times 28$ mesh centrifuge discharge) versus the dosage rate of various dewatering aids expressed as pounds of additive per ton of dry substrate.

The compositions of the present invention are formulated for altering the water function characteristics of a wet, particulate mineral mass by combining a surfactant material component having a specific hydrophile-lipophile balance, with a surfactant adsorption inhibitory agent. The surfactant component is selected so as to maximize its hydrophobic character without adversely affecting its water solubility; and the adsorption inhibitory agent is selected to couple the nonionic surfactant into the water phase and away from the mineral solid/liquid interface, thus keeping the surfactant in solution in the water phase where it can perform the function of lowering surface tension, thereby enhancing capillary flow of water through a solid bed as in a filtration or centrifugation, and affecting dewatering.

The surfactant component of the invention is selected to comprise a single surfactant material or a mixture of surfactants in order to exhibit the required hydrophile-lipophile balance; and the surfactant component is advantageously selected to have an HLB number between from about 6.0 to about 12.0 and preferably between about 7.0 and about 10.0. It is speculated that it is energetically more favorable for a greater proportion of the more hydrophobic surfactant moieties to migrate and align in the mineral slurry at the air/liquid interface as HLB decreases, rather than adsorb at the solid/liquid interface. Moreover, in the case of non-ionic surfactants consisting of ethylene oxide adducts, adsorption of the surfactant very likely would involve an acid-base interaction utilizing unshared pairs of electrons on the oxygen in the polyoxyethylene ether linkages. Thus, the higher ethoxylates not only exhibit greater water solubility but also offer a greater number of adsorption sites. Regardless of the mechanism, however, it appears that the surfactant material desirably is arranged to remain in the aqueous phase where it serves an active function, enhancing capillary flow of water through a filter cake by reducing the surface tension and the viscosity of the filtrate.

One eminently useful class of surfactants for use in the practice of the present invention comprises the condensation products of one mol equivalent of a primary aliphatic alcohol with from 2 to 7 mol equivalents of ethylene oxide. The straight chain aliphatic alcohols containing from 6 to 13 carbon atoms are particularly useful in the practice of the invention; and it has been determined that alcohols containing more than 13 carbon atoms are insufficiently water soluble whereas molecular chains containing less than 6 carbon atoms provide a surfactant molecule which is insufficiently hydrophobic. Similarly, when the alcohol is ethoxylated with more than 7 mols of ethylene oxide, the water solubility of the resultant surfactant has proved excessive.

Tridecyl alcohol is an especially useful ingredient for the surfactants used in the present invention. The adduct of one mol equivalent of tridecyl alcohol with 3 mol equivalents of ethylene oxide exhibits a highly desirable HLB number of 7.5 whereas the corresponding reaction product with 5 mols of ethylene oxide gives a surfactant with a desirable HLB number of 9.8.

The surfactant adsorption inhibitory agent of the instant composition is usefully selected to be a hydrotrope or coupling agent which will act to increase the amount of surfactant that can be dissolved in aqueous solution. The hydrotrope or coupling agent may be selected from among various groups including alkyl aryl sulfonates, cumene sulfonates, ethylene glycol ethers, ethylene glycol esters, diethylene glycol, and materials sold under the tradenames Carbitol and Cellosolve. A preferred hydrotrope useful in this invention is the alkali metal salt of xylene sulfonate, preferably exemplified by sodium xylene sulfonate. While aliquot proportions of surfactant and adsorption inhibitory agent have been conveniently utilized, the practical limits for inclusion of the hydrotrope component in a neat composition according to the invention are between about 10 percent and about 65 percent by weight of the total composition. Inclusion of the hydrotrope component in the present compositions has also been found to assist in solubilizing the surfactant component, particularly when the latter material approaches the upper limits of acceptable hydrophobicity.

In addition to the hydrotrope-surfactant composition previous described, I have found that it is often advantageous to include urea in my compositions. Urea, while not only providing freeze protection for the hydrotrope combination, was in the case of certain minerals, and most notably copper concentrates, appearing to act synergistically with the hydrotrope surfactant combination in the drying of these types of ores. When urea is employed, it is generally added at a freeze protecting amount, generally from a level of from 2-3.5% by weight of the composition, preferably 5-30% and most preferably 7-25%.

The compositions of the present invention are added to mineral/water slurries at levels from about 0.1 to about 1.0 pounds per dry ton of the particulate mineral material. Furthermore, the instant compositions are advantageously utilized in conjunction with a mechanical dewatering procedure such as filtration, centrifugation or the like, in order to promote and accelerate the chemical dewatering action of the additive composition.

For purposes of describing the invention more fully, the following working examples are given without however limiting the invention to the precise details and conditions set forth.

Compositions designated A-F were formulated in acccordance with the invention as set forth above. In addition, the comparison proposes a composition formulated according to my co-pending application, Ser. No. 364,463 filed on Apr. 1, 1982, now U.S. Pat. No. 4,410,431. This composition is identified as composition I. The formulations of these products are set forth below.

| | | |
|---|---|---|
| Composition A | 40% | tridecyl alcohol ethoxylate (5 mole ethylene oxide) |
| | 30% | sodium xylene sulfonate |
| | 9% | urea, prilled |
| | 21% | water |
| Composition B | 30% | tridecyl alcohol ethoxylate (5 mole ethylene oxide) |
| | 20% | sodium xylene sulfonate |
| | 22% | urea, prilled |
| | 28% | water |
| Composition C | 40% | tridecyl alcohol ethoxylate (5 mole ethylene oxide) |
| | 35% | sodium xylene sulfonate |
| | 25% | water |
| Composition D | 30% | tridecyl alcohol ethoxylate (5 mole ethylene oxide) |
| | 25% | sodium xylene sulfonate |
| | 9% | urea, prilled |
| | 36% | water |
| Composition E | 30% | tridecyl alcohol ethoxylate (5 mole ethylene oxide) |
| | 25% | sodium xylene sulfonate |
| | 45% | water |
| Composition F | 30% | tridecyl alcohol ethoxylate (5 mole ethylene oxide) |
| | 45% | sodium xylene sulfonate |
| | 25% | water |
| Composition I | 50% | tridecyl alcohol ethoxylate (5 mole ethylene oxide) |
| | 50% | Tall Oil Fatty Acid |

EXAMPLE 1

In order to determine the effectiveness and show the synergism of the components of the subject invention, tests were performed on an eastern coal substrate using a pilot centrifuge according to the method detailed in Example 1 of co-pending application, Ser. No. 364,463 filed on Apr. 1, 1982, now U.S. Pat. No. 4,410,431, which is hereinafter incorporated by reference. As shown in FIG. 1, composition C yields a lower percentage of moisture in a treated coal than its individual ingredients or the sum of its individual ingredients.

EXAMPLE 2

Figure 2:
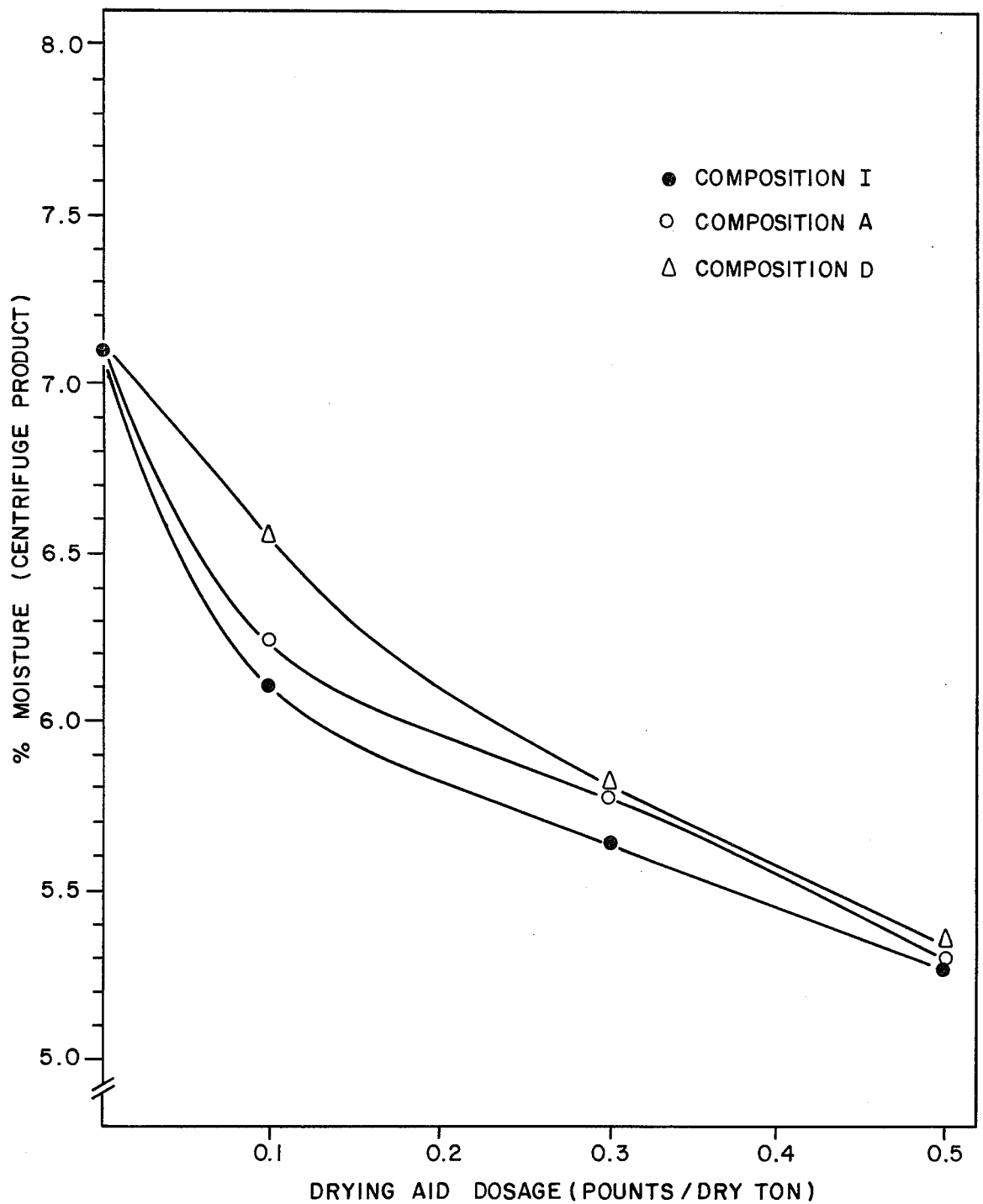
Figure 3:
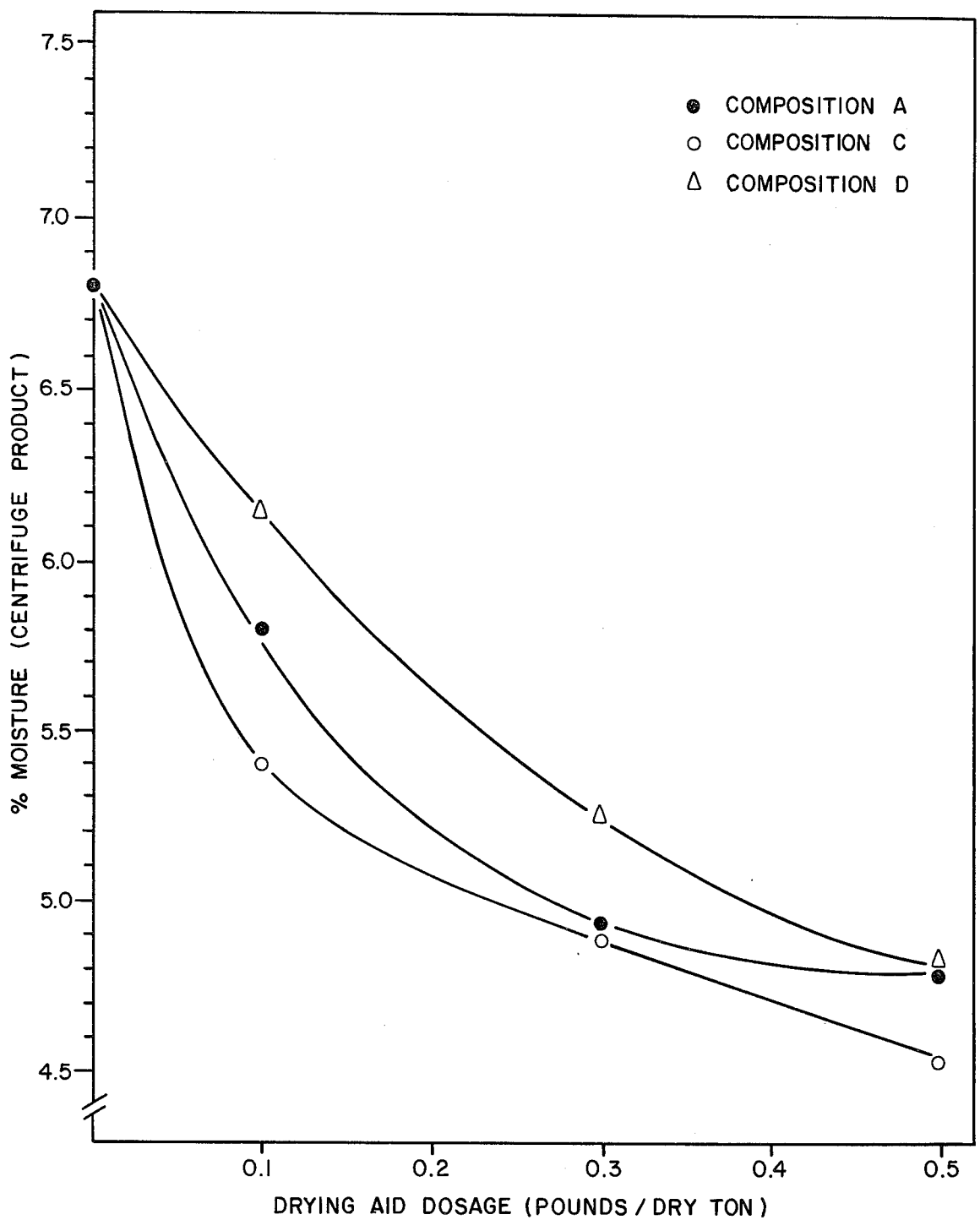
Figure 4:
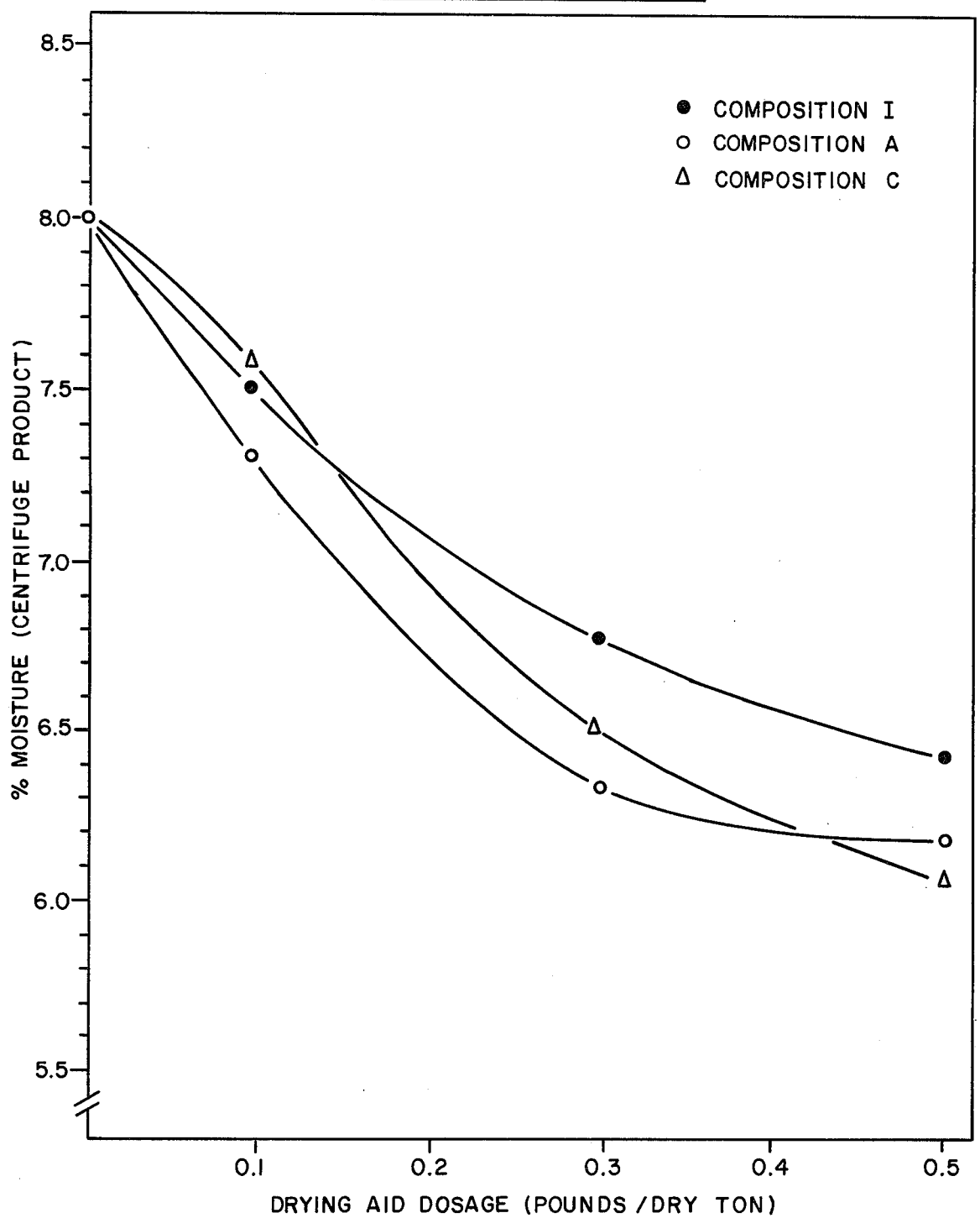

Experimental work was conducted on an eastern coal according to the procedure previously described. Results showing the effect of the compositions of the instant invention are shown as FIGS. 2-4.

EXAMPLE 3

Compositions of the subject invention were tested as drying agents on a sample of copper concentrate ore from a copper producer in the western part of the United States.

Figure 5:
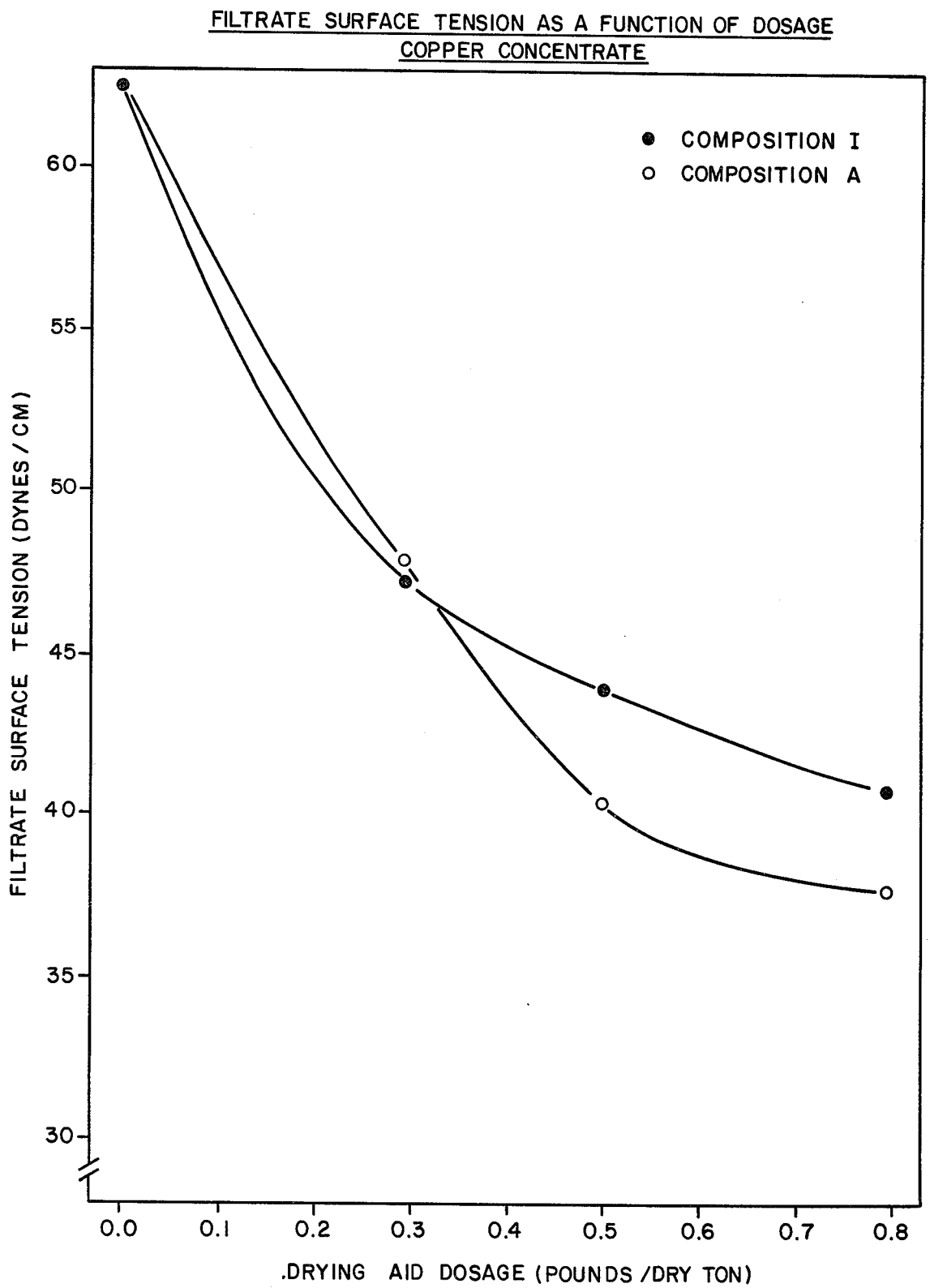
FIG. 5 relates moisture contents of copper concentrate filter cakes to product dosage, again expressed in pounds of additive per dry ton.

FIG. 5 shows the effect of the composition of the instant invention as compared to composition I. Surface tension indicates the amount of water removable from the copper concentrate. Table 1 shows the effect and gives percent moisture results for the filter cakes obtained using the composition of the instant invention.

TABLE 1

| COPPER CONCENTRATE FILTRATION RESULTS | | |
|---|---|---|
| Drying Aid Product | Product Dosage (pound/dry ton) | Percent Moisture in filter cake |
| (Blank) | — | 17.4% |
| Composition A | 0.8 | 14.9% |
| Composition E | 0.8 | 16.6% |
| Composition D | 0.8 | 16.0% |
| Composition B | 0.8 | 15.5% |
| Composition F | 0.8 | 16.3% |

In order to show the effect of urea on the drying of mineral concentrates, experiments were run comparing compositions B, D and E at similar dosage levels. Results showing the effect of added urea, while maintaining other ingredients equal, is shown in Table 2.

TABLE 2

| EFFECT OF UREA CONTENT ON CAKE MOISTURE | | |
|---|---|---|
| Drying Aid Product | Product Dosage (pound/dry ton) | Percent Moisture in filter cake |
| Composition E | 0.8 | 16.6% |
| Composition D | 0.8 | 16.0% |
| Composition B | 0.8 | 15.5% |

EXAMPLE 4

Composition C was evaluated in a commercial coal preparation plant in the eastern portion of the United States. The use of composition C reduced the CMI dryer product moisture from 7.5% to 5.5% at a dosage of 0.3 lbs per ton. At a dosage of 0.6 lbs per ton, moisture was reduced from 7.5% to 4.5%. At higher dosages composition I did not perform as well, but matched the performance of composition C at dosages at or below 0.2 lbs per ton.

The plant chosen for this test produces on the order of 600 tons of coal per hour. Of this total, 270 tons/hr. of ¼"×28 are mechanically dewatered by way of three sets of dewatering screens and tandem CMI centrifugal dryers. Approximately 100 tons/hr. production results from the fine coal circuit (28×0) via banks of disc filters. The plant currently thermally dries all of the ¼"×28 production, and half of the 28 ×0 production. The target moisture content for coal leaving the plant is 6%.

A single ¼"×28 dewatering screen and CMI dried were isolated and outfitted with spray bars and application equipment. Sample ports were cut into the discharge chutes of the CMI dryer, in order that CMI product could readily be obtained. Results are shown in Table III.

TABLE 3

| TABULAR RESULTS OF DRYING AID EVALUATION EASTERN U.S. COAL PREPARATION PLANT | | | |
|---|---|---|---|
| Date | Product | Dosage (pounds/ton) | % Moisture |
| 1st day | (blank) | — | 7.97 |
| " | C | 0.20 | 7.26 |
| " | C | 0.35 | 5.46 |
| " | C | 0.65 | 4.65 |
| " | (blank) | — | 7.86 |
| 2nd day | (blank) | — | 7.58 |
| " | (blank) | — | 7.20 |
| " | I | 0.30 | 6.37 |
| " | C | 0.30 | 5.63 |
| " | (blank) | — | 7.40 |
| " | (blank) | — | 7.48 |
| " | C | 0.20 | 6.41 |
| " | I | 0.20 | 6.60 |
| " | I | 0.10 | 6.71 |
| " | C | 0.10 | 6.98 |
| " | (blank) | — | 6.99 |
| " | C | 0.70 | 4.10 |
| " | I | 0.70 | 5.99 |

Therefore we claim:

1. A composition for altering the water function characteristics of a wet, particulate mineral mass comprising: a surfactant material having a hydrophile-lipophile balance number of from about 6.0 to about 12.0; and a surfactant adsorption inhibitory amount of a hydrotrope.

2. A composition for altering the water function characteristics of a wet, particulate mineral mass according to claim 1 wherein said hydrotrope is selected from the group consisting of alkyl aryl sulfonates, cumene sulfonates, ethylene glycol ethers, ethylene glycol esters and diethylene glycol.

3. A composition for altering the water function characteristics of a wet, particulate mineral mass according to claim 2 wherein said hydrotrope is an alkali metal xylene sulfonate.

4. A composition for altering the water function characteristics of a wet particulate mineral mass according to claim 3 containing, in addition, from 2 to 35% urea.

5. A composition for altering the water function characteristics of a wet, particulate mineral mass according to claim 1 wherein said surfactant material is the reaction product on one mol equivalent of a primary aliphatic alcohol containing from 6 to 13 carbon atoms with from 2 to 7 mol equivalents of ethylene oxide.

6. A composition for altering the water function characteristics of a wet, particulate mineral mass according to claim 5 wherein said primary aliphatic alcohol is tridecyl alcohol.

7. A composition for altering the water function characteristics of a wet, particulate mineral mass according to claim 1 wherein the hydrotrope is present in a ratio, with respect to said surfactant material, of from about 1:9 to 2:1 by weight.

8. The method of dewatering a wet, particulate mineral mass which comprises the steps of: adding the composition of any one of claims 1 through 7 inclusive to a particulate mineral/water slurry in an amount of from about 0.1 to about 1.0 pounds per dry ton of particulate mineral material; and thereafter subjecting the slurry to a mechanical dewatering procedure.

9. The method of dewatering a wet, particulate mineral mass according to claim 8 wherein said mechanical dewatering procedure is centrifugation 10. The method of dewatering a wet, particulate mineral mass according to claim 8 wherein said mechanical dewatering procedure is filtration.

* * * * *